(12) United States Patent
Sugiyama (10) Patent No.: US 9,163,756 B2
(45) Date of Patent: Oct. 20, 2015

(54) CORRUGATED TUBE

(71) Applicant: Yazaki Corporation, Tokyo (JP)

(72) Inventor: Atsushi Sugiyama, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/043,042

(22) Filed: Oct. 1, 2013

(65) Prior Publication Data

US 2014/0027002 A1    Jan. 30, 2014

Related U.S. Application Data

(63) Continuation-in-part of application No. PCT/JP2012/059038, filed on Apr. 3, 2012.

(30) Foreign Application Priority Data

Apr. 4, 2011  (JP) ................................. 2011-082520

(51) Int. Cl.
*F16L 11/11* (2006.01)
*H02G 3/04* (2006.01)

(52) U.S. Cl.
CPC .............. *F16L 11/11* (2013.01); *H02G 3/0468* (2013.01)

(58) Field of Classification Search
CPC ....... F16L 11/11; F16L 11/15; F16L 2201/60; F16L 2201/10
USPC .................................................. 138/121, 104
See application file for complete search history.

(56) References Cited

U.S. PATENT DOCUMENTS

| 2,606,953 | A | * | 8/1952 | Weston | ....................... 174/126.3 |
| 2,930,007 | A | * | 3/1960 | Anderson et al. | ............. 333/241 |
| 5,911,450 | A | | 6/1999 | Shibata et al. | |
| 6,078,009 | A | * | 6/2000 | Kawamura | ................ 174/102 R |
| 6,079,451 | A | * | 6/2000 | Hegler | ........................... 138/121 |
| 6,129,120 | A | * | 10/2000 | Margot | ........................... 138/121 |
| 6,904,941 | B2 | * | 6/2005 | Howard | ........................ 138/167 |
| 7,045,709 | B2 | * | 5/2006 | Koike et al. | ................... 174/480 |
| 7,891,383 | B2 | | 2/2011 | Baverel et al. | |

(Continued)

FOREIGN PATENT DOCUMENTS

| EP | 0860921 A1 | 8/1998 |
| FR | 2764449 A1 | 12/1998 |
| GB | 2336475 A | 10/1999 |

(Continued)

OTHER PUBLICATIONS

International Search Report dated May 1, 2012, issued for PCT/JP2012/059038.

(Continued)

*Primary Examiner* — James Hook
(74) *Attorney, Agent, or Firm* — Locke Lord LLP (57) ABSTRACT

The corrugated tube includes a body in which a plurality of peaks and a plurality of valleys are continuously alternated in a longitudinal direction of the body. A slit is formed in the body along the longitudinal direction. Both end portions of the body between which the slit is interposed are overlapped. A mark is provided to only one peak of the plurality of peaks at the one end portion of the body, and another mark is also provided to corresponding only one peak of the plurality of peak disposed at the other end portion of the body and brought into a fitting engagement with the marked peak disposed at the one end portion of the body.

4 Claims, 8 Drawing Sheets

(56) References Cited

U.S. PATENT DOCUMENTS

| | | |
|---|---|---|
| 2003/0173555 A1* | 9/2003 | Supkis et al. .......... 254/134.3 R |
| 2009/0140105 A1* | 6/2009 | Baverel et al. ................. 248/49 |

FOREIGN PATENT DOCUMENTS

| | | |
|---|---|---|
| JP | 09-178049 A | 7/1997 |
| JP | 09-213141 A | 8/1997 |
| JP | 2000-287329 A | 10/2000 |
| JP | 2003-79021 A | 3/2003 |
| JP | 2005-176561 A | 6/2005 |
| JP | 2009-142100 A | 6/2009 |
| JP | 2009-542180 A | 11/2009 |

OTHER PUBLICATIONS

The extended European search report dated Aug. 13, 2015 issued for European Patent Application No. 12 76 8583.2.

Office Action mailed Sep. 1, 2015 issued for corresponding Korean Patent Application No. 10-2013-7028848.

* cited by examiner

CORRUGATED TUBE

TECHNICAL FIELD

The invention relates a corrugated tube, in particular, a corrugated tube provided with a body in which a plurality of peaks and a plurality of valleys are continuously alternated in a longitudinal direction of the body, and a slit formed in the body along the longitudinal direction of the body. The both end portions of the body between which the slit is interposed overlaps with each other.

BACKGROUND OF THE INVENTION

Conventionally, a wiring harness disposed in a vehicle has been often covered by a corrugated tube formed of synthetic resin to protect the wiring harness from any damage due to hindrance of, for example, any projection present in the location in which the wiring harness is disposed.

Figure 11A:
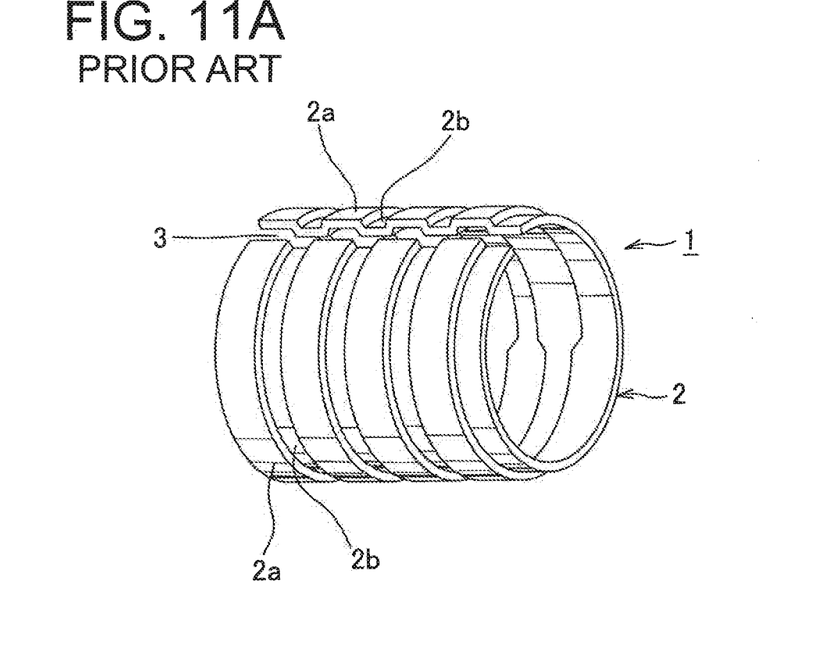
FIG. 11A is a perspective view of a conventional corrugated tube (before engagement)
Figure 11B:
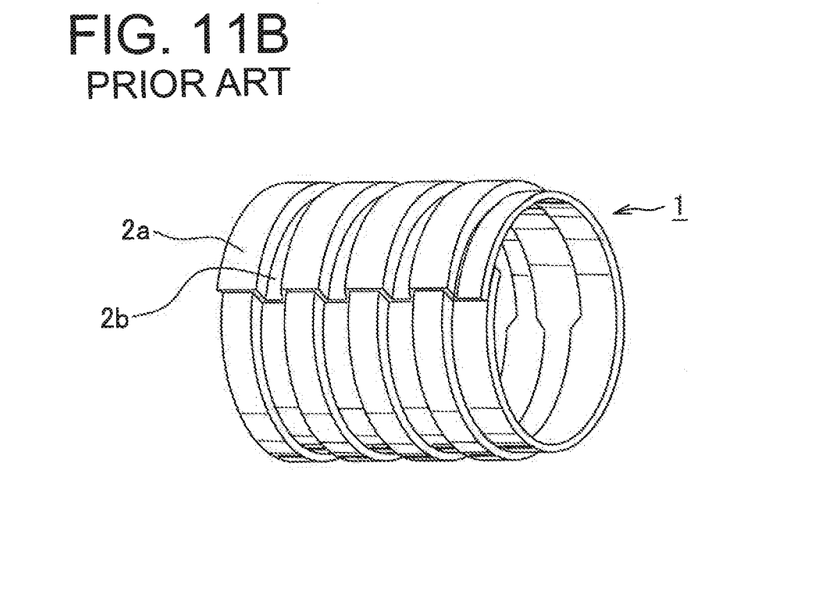
FIG. 11B is a perspective view of the conventional corrugated tube (after engagement).

A conventional corrugated tube which has been proposed is shown in FIG. 11. Referring to FIG. 11, the corrugated tube 1 includes a body 2 in which a plurality of peaks 2a and a plurality of valleys 2b are continuously alternated in a longitudinal direction Y1 of the body 2, and a slit 3 formed in the body 2 in the longitudinal direction Y1. The corrugated tube 1 is configured to receive a wiring harness (not shown) through the slit 3 and cover the whole wiring harness.

Referring to FIG. 11B, after the corrugated tube 1 receives the wiring harness through the slit 3, the both end portions of the body 2 between which the slit 3 of the body 2 is interposed are overlapped to close the slit 3. In this state, the both end portions of the body 2 can overlap together by fitting engagements between the peak 2a disposed in one end portion of the body 2 and the corresponding mating or counterpart peak 2a disposed in the other end portion of the body 2, and between the valley 2b disposed in one end portion of the body 2 and the corresponding mating or counterpart peak 2b disposed in the other end portion of the body 2.

However, in the case of the afore-mentioned conventional corrugated tube 1, the engagement of the both end portions between which the slit 3 is interposed is not easy. This is because the peak 2a disposed in the one end portion and the corresponding mating peak 2a disposed in the other end portion and the valley 2b disposed in the one end portion and the corresponding mating valley 2b disposed in the other end portion may be misaligned during the engagement. For example, the peak 2a disposed in the one end portion may be brought into a fitting engagement with other peak 2a adjacent to the corresponding mating peak 2a disposed in the other end portion.

Due to the afore-mentioned misaligned engagement, the slit 3 disposed inside the corrugated tube 1 has a tendency to outwardly protrude, thereby causing greater likelihood of compromising the insulator of the wiring harness received inside the corrugated tube 1. This would cause quality degradation of a final product. For the reasons, after the completion of the engagement, the corrugated tube 1 is visually inspected. If there is a misaligned engagement, the operation of the engagement would be performed once again for correction. There is no doubt the inspection and re-engagement are cost- and time-consuming jobs.

CITATION LIST

Patent Literature

[PTL 1]
JP 2009-542180 A
[PTL 2]
JP 2005-176561 A
[PTL 3]
JP 2000-287329 A
[PTL 4]
JP 119-213141 A

SUMMARY OF INVENTION

Technical Problem

The objective of the invention is to provide a new corrugated tube in which when both end portions of a body between which a slit is interposed are overlapped, a peak of one end portion can be precisely brought into an engagement with a corresponding mating peak of an opposite end portion (i.e., the other end portion), and a valley of the end portion can be precisely brought into an engagement with a corresponding mating valley of the opposite end portion. Due to this, engagement workability can be greatly enhanced.

Solution to Problem

One aspect of the invention provides a corrugated tube, which includes a body in which a plurality of peaks and a plurality of valleys are continuously alternated in a longitudinal direction of the body, and a slit formed in the body along the longitudinal direction of the body. The both end portions of the body between which the slit is interposed are overlapped. A mark is provided to only one peak of the plurality of peaks or only one valley of the plurality of valleys at an one end portion of the body. Another mark is provided to corresponding only one peak or valley which is disposed at the other end portion of the body and brought into a fitting engagement with the marked peak or valley disposed at the one end portion of the body.

Another aspect of the invention provides a corrugated tube, which includes a body in which a plurality of peaks and a plurality of valleys are continuously alternated in a longitudinal direction of the body, and a slit formed in the body along the longitudinal direction of the body. Both end portions of the body between which the slit is interposed are overlapped. At least two marks are respectively provided to at least two peaks of the plurality of peaks or at least two valleys of the plurality of valleys at an one end portion of the body. In addition, at least two marks are respectively provided to at least two corresponding valleys or peaks which are disposed at the other end portion of the body and respectively brought into a fitting engagement with the at least two marked peaks or valleys disposed at the one end portion of the body. The at least two marks are arranged at an interval of at least one peak or valley in the longitudinal direction of the body.

Further another aspect of the invention provides a corrugated tube, which includes a body in which a plurality of peaks and a plurality of valleys are continuously alternated in a longitudinal direction of the body, and a slit formed along the longitudinal direction in the body. Both end portions of the body between which the slit is interposed are overlapped. Neighboring peaks or neighboring valleys have different shapes in a longitudinal direction of the body.

Advantageous Effects of Invention

In accordance with the one aspect and another aspect of the invention, the marked peaks disposed in the both end portion between which the slit is interposed are brought into the fitting engagement, thereby allowing for the precise engagement between the mating peaks and between the mating valleys. Accordingly, the engagement is further simplified, and engagement workability can be enhanced.

In accordance with the further another aspect of the invention, the neighboring peaks arranged in the longitudinal direction of the body have shapes different from each other, and the neighboring valleys arranged in the longitudinal direction of the body have shapes different from each other. For the above reason, the peak-and-peak engagement and the valley-and-valley engagement between the both end portions can be easily made by the engagements between the mating peaks and between the mating valleys. This is because when the peak of the one end portion engages, not the corresponding mating peak, but the peak neighboring the corresponding mating peak of the other end portion, misaligned engagement occurs. In the misaligned engagement, normal fitting engagement cannot be obtained. As a result, one can immediately recognize the misaligned engagement, and the misaligned engagement can be corrected on site.

DESCRIPTION OF EMBODIMENTS

First Embodiment

Figure 1A:
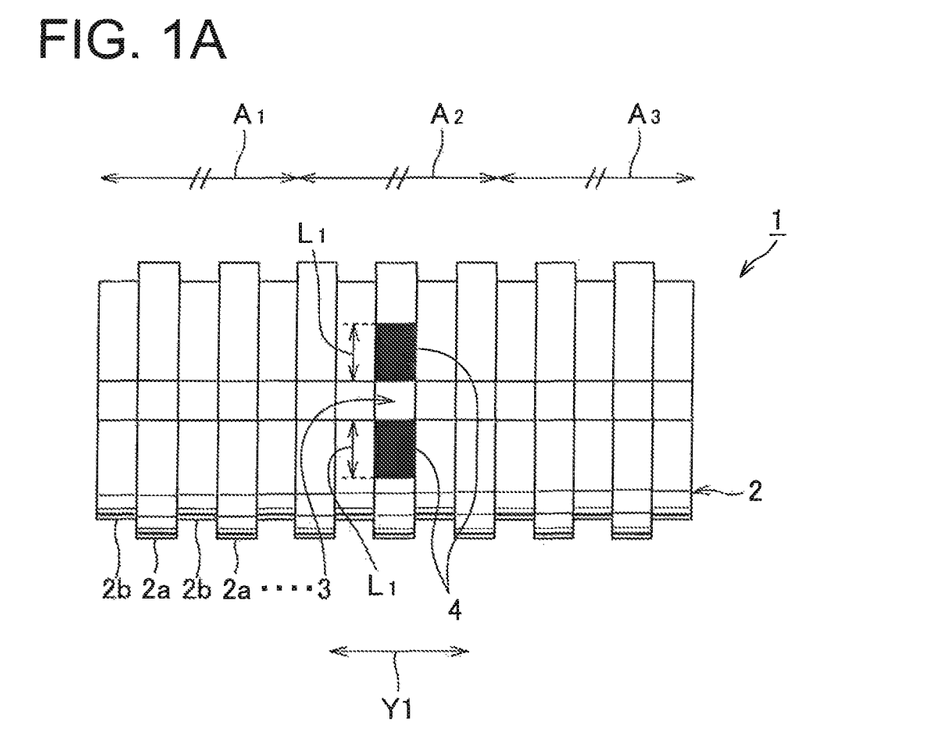
FIG. 1A is a side view of a first embodiment of a corrugated tube in accordance with the invention.
Figure 1B:
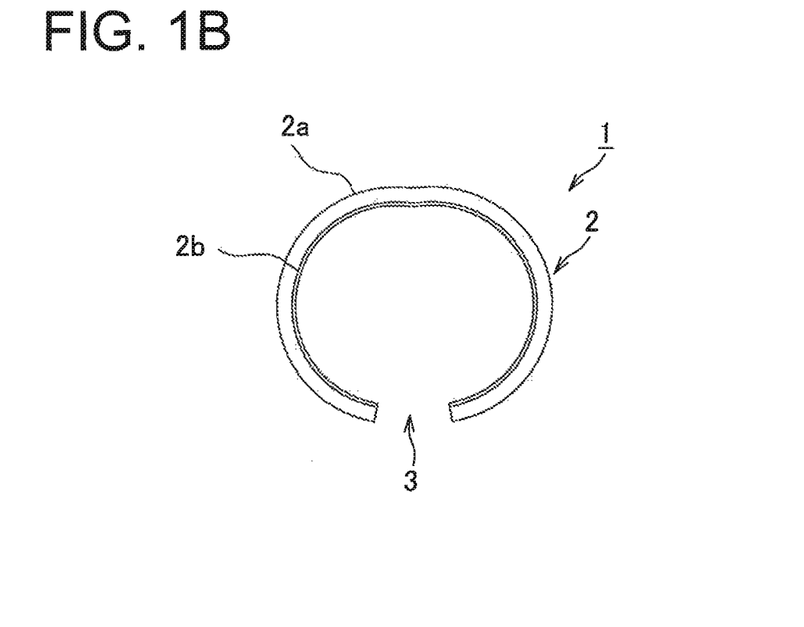
FIG. 1B is a front view of the corrugated tube of FIG. 1A.
Figure 2:
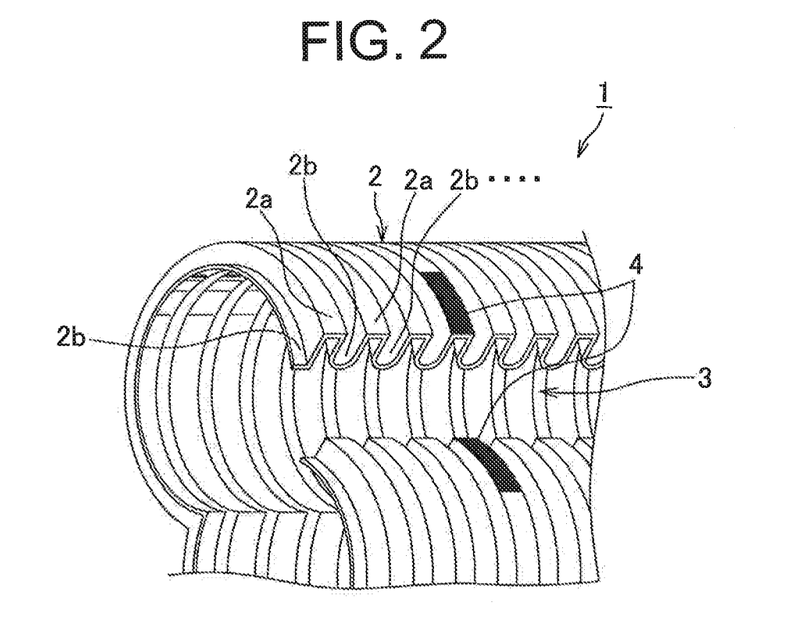
FIG. 2 is a partial perspective view of the corrugated tube of FIG. 1A.
Figure 3A:
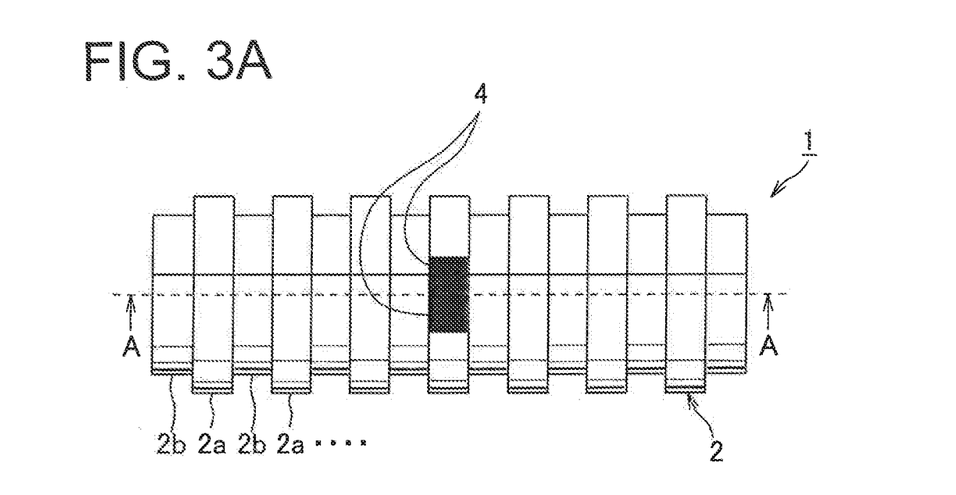
FIG. 3A is a side view of the corrugated tube of FIG. 1A in a state that both end portions of a body between which a slit is interposed are overlapped.
Figure 3B:
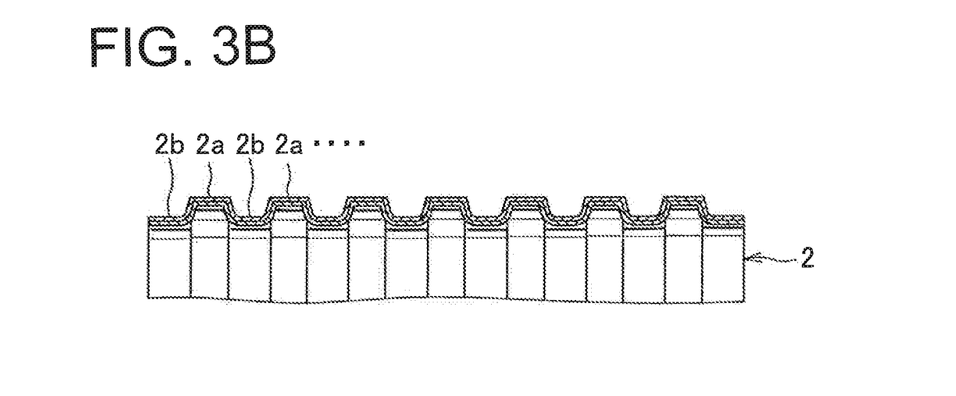
FIG. 3B is a cross-sectional view of the corrugated tube of FIG. 3A along the line A-A.
Figure 3C:
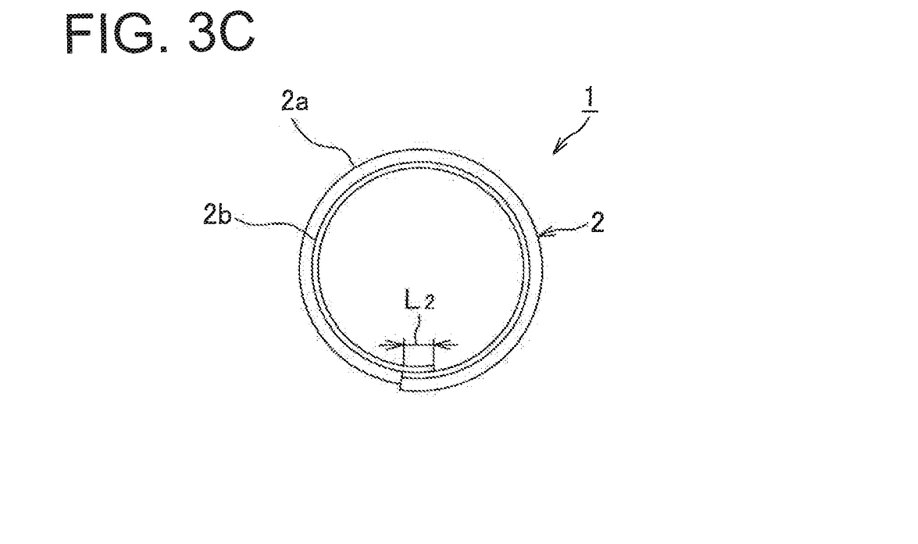
FIG. 3C is a front view of the corrugated tube of FIG. 3A.

A first embodiment of a corrugated tube in accordance with the invention will be hereinafter described with reference to FIGS. 1-3. FIG. 1A is a side view of an embodiment of a corrugated tube in accordance with the invention; FIG. 1B is a front view of the corrugated tube of FIG. 1A; FIG. 2 is a partial perspective view of the corrugated tube of FIG. 1A; FIG. 3A is a side view of the corrugated tube of FIG. 1A in a state that both end portions between which a slit 3 is interposed are overlapped; FIG. 3B is a cross-sectional view of the corrugated tube of FIG. 3A along the line A-A; and FIG. 3C is a front view of the corrugated tube of FIG. 3A.

The corrugated tube 1 is configured to receive a wiring harness arranged in, for example, a vehicle so as to protect it. As shown in the above drawings, the corrugated tube 1 is provided with a body 2 in which a plurality of peaks 2a and a plurality of valleys 2b are continuously alternated in a longitudinal direction Y1 of the body 2 or the corrugated tube 1. A slit 3 is formed in the body 2 along the longitudinal direction of the body 2 or the corrugated tube 1.

The body 2 is approximately cylindrically-shaped, and formed of insulating material. The slit 3 is disposed from one end portion of to the other end portion (i.e., the opposite end portion) along the longitudinal direction Y1 of the body 2 so as to receive a wiring harness (not shown) in the body 2. After the wiring harness is inserted through the slit 3 into the body 2, the one end portion and the other end portion between which the slit 3 is interposed is overlapped, as shown in FIG. 3. As such, the slit 3 is closed. Referring to FIG. 3B, the peak 2a of the one end portion and the corresponding mating peak 2a of the other end portion (i.e., the opposite end portion) are brought into a fitting engagement, and the valley 2b of the one end portion and the corresponding mating valley 2b of the other end portion are brought into a fitting engagement. As a result, the one end portion and the other end portion of the body 2 are overlapped.

Furthermore, referring to FIG. 3A, a mark 4 is respectively provided to only one of the plurality of peaks 2a disposed in the one end portion of the body 2 and only one of the plurality of peaks 2a disposed in the other end portion of the body 2. Of course, the one end portion and the other end portion correspond to the both end portions between which the slit 3 is interposed. The mark 4 is imparted to a top surface of the peak 2a, and is colored such that it can be differentiated from the body 2. Coloring of the peak 2a can be made by printing, painting, using a magic color, and so on. Referring to FIG. 1A, the mark 4 is imparted to a peak 2a disposed in a middle area $A_2$ given that the body 2 is evenly divided into three areas (i.e., $A_1$, $A_2$, and $A_3$) along in its longitudinal direction Y1. In the embodiment, the mark 4 is disposed in the middle of the body 2 in the longitudinal direction Y1. Furthermore, the length $L_1$ of the mark 4 (FIG. 1A) is greater than the length $L_2$ of the overlapped portion of the both end portions (FIG. 3C).

Next, the procedure of the engagement of the both ends of the body 2 will be hereinafter described. Firstly, after the wiring harness (not shown) is inserted through the slit 3 into the body 2, the peaks 2a having the mark 4 thereon and disposed in both end portions between which the slit 3 is interposed are brought into a fitting engagement. Subsequently, the valleys 2b of the both end portions which are respectively adjacent to the marked peaks 2a in the same direction along the longitudinal direction Y1 are brought into a fitting engagement. Of course, the valleys 2b adjacent to the marked peak 2a and disposed at one side with respect to the marked peak 2a and the valleys 2b adjacent to the marked peaks 2a and disposed at the other side with respect to the marked peak 2a can be brought into fitting engagements at the same time. Subsequently, further fitting engagements are symmetrically performed with respect to the marked peak 2a in the longitudinal direction Y1. In other words, two symmetrical fitting engagements are performed at the same time.

The peak 2a-and-peak 2a engagement and the valley 2b-and-valley 2b engagement are alternated.

In accordance with the embodiment of the corrugated tube 1, the marked peaks 2a disposed in the both end portion between which the slit 3 is interposed are brought into the fitting engagement, thereby allowing for the precise engagement between the mating peaks 2a and between the mating valleys 2b. Accordingly, the engagement is further simplified, and engagement workability can be enhanced.

In accordance with the embodiment of the corrugated tube 1, the length $L_1$ of the mark 4 is greater than the length $L_2$ of the overlapped portion between the both end portions of the body 2. Accordingly, one can visually investigate that the marked peaks 2a are engaged together after the completion of the engagement.

In accordance with the embodiment of the corrugated tube 1, the mark 4 is imparted to a peak 2a disposed in the middle area $A_2$ given that the body 2 is evenly divided into three areas (i.e., $A_1, A_2$, and $A_3$) along in its longitudinal direction Y1. In the embodiment, the mark 4 is disposed in the middle of the body 2 in the longitudinal direction Y1. The engagement between the peak 2a-and-peak 2a and the engagement between the valley 2b-and-valley 2b are alternated, and two symmetrical engagements between the peaks 2a or between the valleys 2b occur in both directions with respect to the marked peak 2a along the longitudinal direction Y1 of the body 2. As a result, a period of time taken for the engagement can be decreased in comparison to the conventional engagement.

Figure 4:
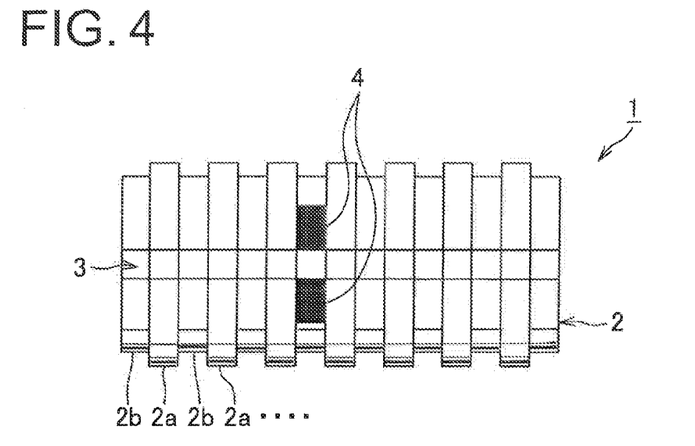
FIG. 4 is a side view of a modified embodiment of the corrugated tube in accordance with the invention.

Moreover, in accordance with the embodiment of the corrugated tube 1, the mark 4 is provided to only one peak 2a of the plurality of peaks 2a. However, the invention is not limited the above embodiment. For example, as shown in FIG. 4, the mark 4 may be provided to only one of the plurality of the valleys 2b.

Figure 5:
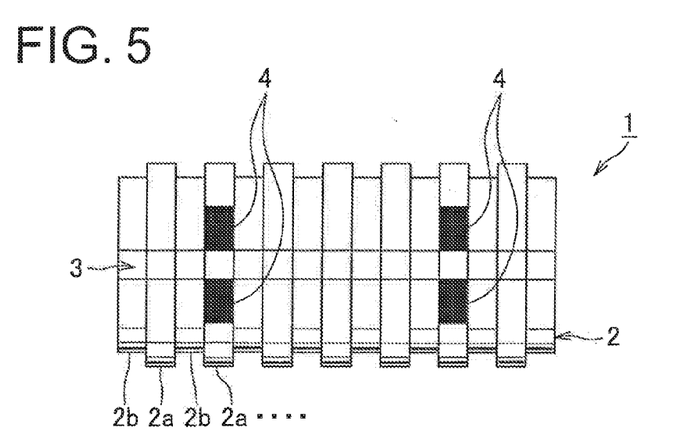
FIG. 5 is a side view of another modified embodiment of the corrugated tube in accordance with the invention.
Figure 6:
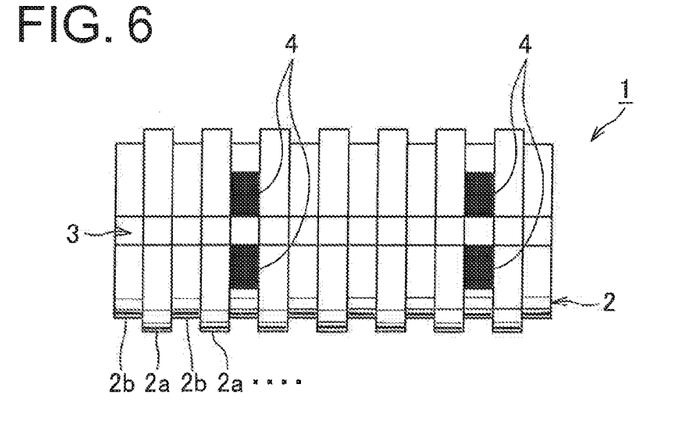
FIG. 6 is a side view of further another modified embodiment of the corrugated tube in accordance with the invention.

In accordance with the embodiment of the corrugated tube 1, the mark 4 is provided to only one peak 2a of the plurality of peaks 2a. However, the invention is not limited to the above embodiment. For example, as shown in FIG. 5, the mark 4 is provided to two peaks 2a of the plurality of the peaks 2a. The two marks 4 can be provided such that they are spaced apart from each other at an interval of at least one peak 2a along the longitudinal direction Y1. In other words, one marked peak 2a and the other marked peak 2a are not continuously disposed. Referring to FIG. 5, there are provided three peaks 2a between the one marked peak 2a and the other marked peak 2a. In other words, there is an interval of three peaks 2a.

Referring to FIG. 5, the marks 4 are imparted to two peaks 2a of the plurality of peaks 2a. However, the invention is not limited to the embodiment. Two or more marks can be provided. However, the marked peaks 2a should be disposed such at least one peak 2a is provided between the marked peaks 2a along the longitudinal direction Y1.

Furthermore, at least two marks 4 can be provided to the plurality of valleys 2b. In this case, the marked valleys 2b should be disposed such that at least one valley 2b is provided between the marked valleys 2b along the longitudinal direction Y1.

Figure 7A:
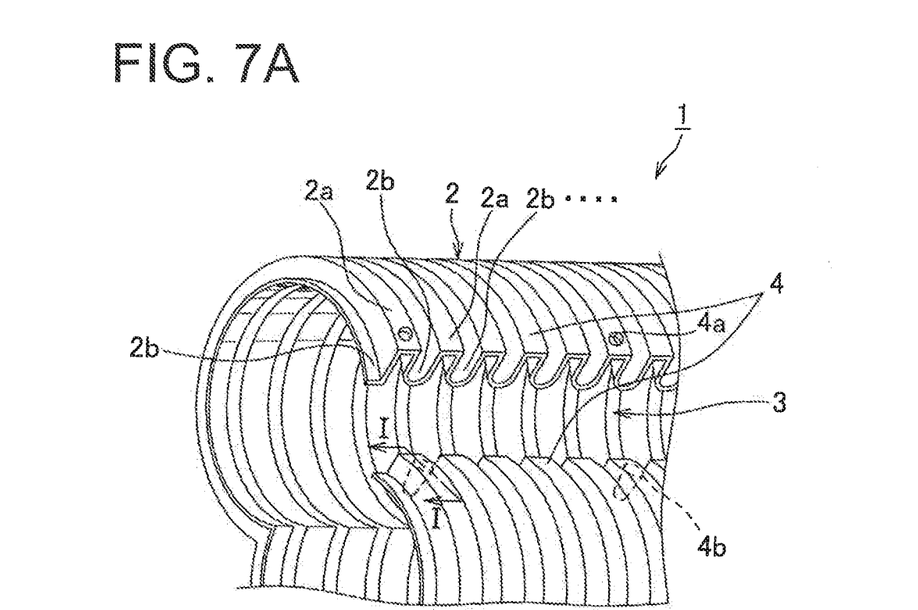
FIG. 7A is a partial perspective view of a modified version of the corrugated tube.
Figure 7B:
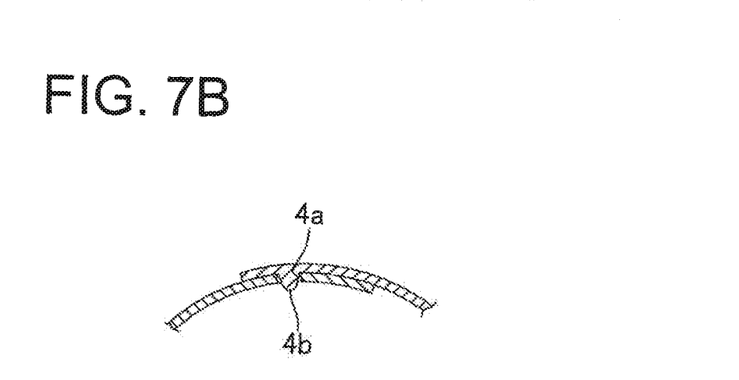
FIG. 7B is a partial cross-sectional view of the corrugated tube of FIG. 7A along the line I-I.

In accordance with the embodiment, coloring of the mark 4 can be made by printing, painting, using a magic color, and so on. However, the invention is not limited to the above embodiment. Referring to FIG. 7, the marks 4 can be provided as a hole 4a and a projection 4b. The hole 4a can be disposed in the one end portion, and the projection 4b can be disposed in the other end portion. In this case, the projection 4b is engageable with the hole 4a. Instead of the hole 4a a depression may be provided in the other end portion of the body 2.

Second Embodiment of Corrugated Tube

Figure 8A:
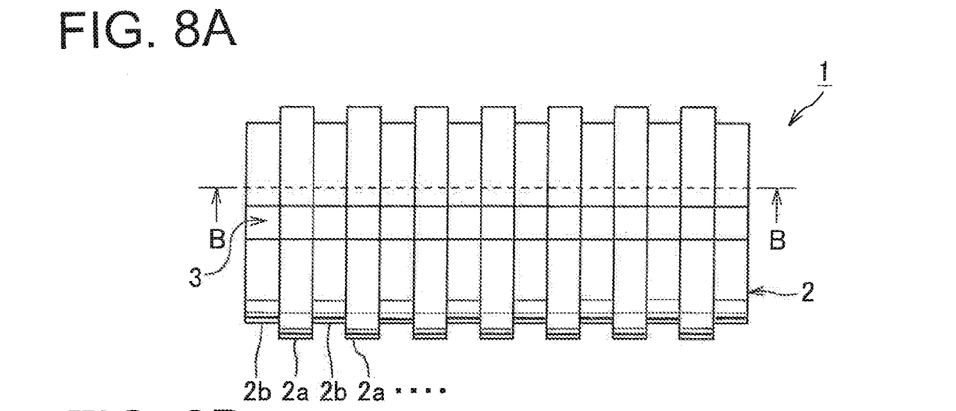
FIG. 8A is a side view of a second embodiment of the corrugated tube in accordance with the invention.
Figure 8B:
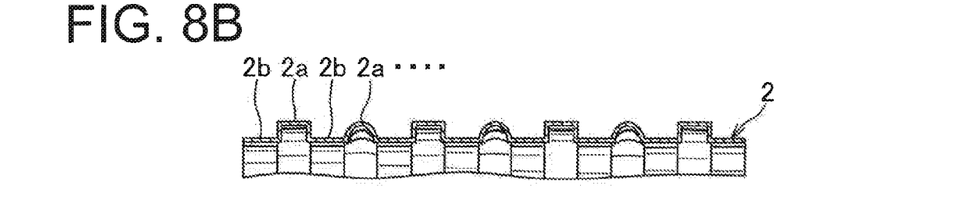
FIG. 8B is a partial cross-sectional view of the corrugated tube of FIG. 8A along the line B-B.
Figure 9A:
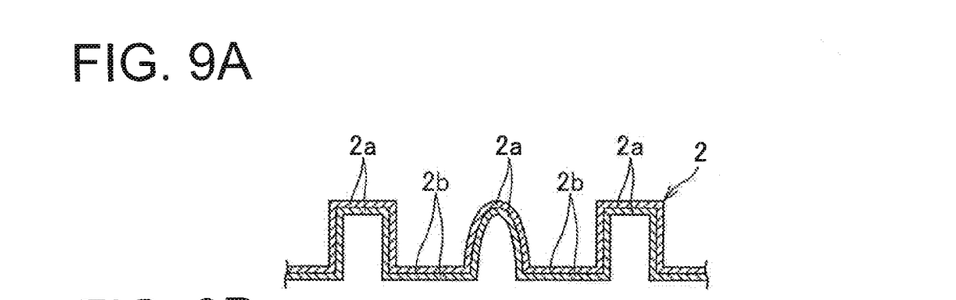
FIG. 9A is a partial cross-sectional view of the corrugated tube in which the peak-and-peak and the valley-and-valley are brought into correct engagements.

Next, a second embodiment of the corrugated tube in accordance with the invention will be hereinafter described with reference to FIGS. 8 and 9. FIG. 8A is a side view of a second embodiment of a corrugated tube in accordance with the invention; FIG. 8B is a cross-sectional view of the corrugated tube of FIG. 8A along the line B-B; FIG. 9A is a partial cross-sectional view of the corrugated tube in which the peak-and-peak and the valley-and-valley are brought into correct engagements, and FIG. 9B is a partial cross-sectional view of the corrugated tube in which peak-and-peak and the valley-and-valley are brought into a misaligned engagements.

Figure 9B:
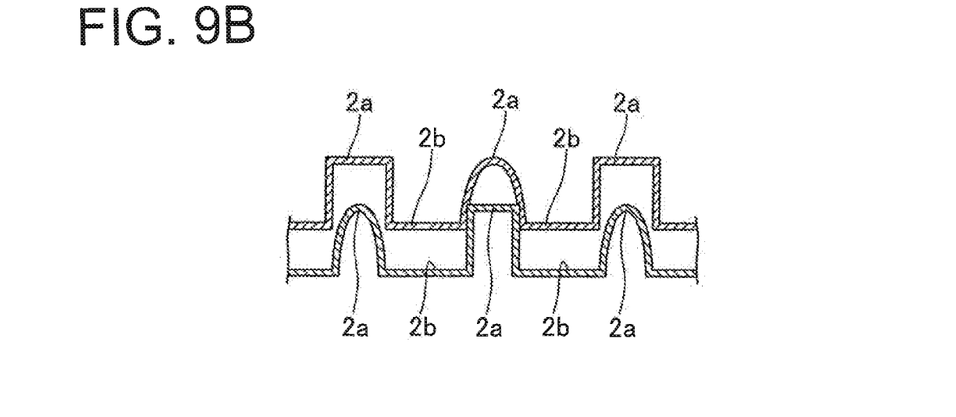
FIG. 9B is a partial cross-sectional view of the corrugated tube in which peak-and-peak and the valley-and-valley are brought into a misaligned engagements.

The details of the same parts or reference numerals in FIGS. 8 and 9 as those in FIG. 1-3 are omitted. Of course, the same parts are designated by the same reference numerals. The second embodiment of the corrugated tube is most different from the first embodiment of the corrugated tube in that the mark 4 is not provided. Furthermore, while the first embodiment of the corrugated tube has the peaks 2a having the same shape, the neighboring peaks 2a in the longitudinal direction Y1 have their shapes which are different from each other in accordance with the second embodiment of the corrugated tube.

For the reasons, as shown in FIG. 9A, the peak-and-peak engagement and the valley-and-valley engagement can be easily made by the engagements between the mating peaks 2a and between the mating valleys 2b. In comparison to FIG. 9A, when the peak 2a of the one end portion engages not the corresponding mating peak 2a but the peak 2a neighboring the corresponding mating peak 2a of the other end portion, misaligned engagement occurs. In the misaligned engagement, normal fitting engagement cannot be obtained. As a result, one can immediately recognize the misaligned engagement, and the misaligned engagement can be corrected on site.

Figure 10:
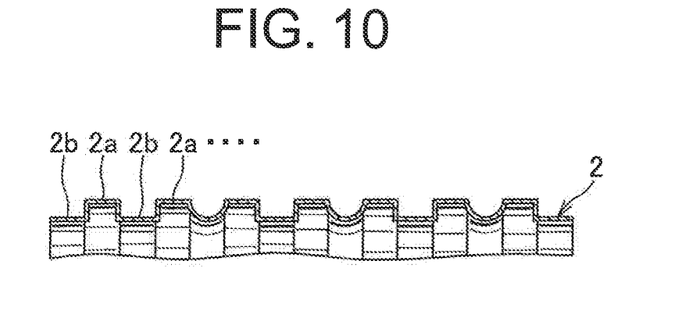
FIG. 10 is a cross-sectional view of the corrugated tube of FIG. 8A along the line B-B.

In accordance with the second embodiment of the invention, the neighboring peaks 2a have the shapes which are different from each other. However, the invention is not limited to the above embodiment. For example, referring to FIG. 10 the valleys 2b neighboring in the longitudinal direction Y1 have the shapes which are different from each other.

Various disclosed aspects and features of the invention may be combined in ways not listed above. Accordingly, the invention should not be viewed as being limited to the disclosed embodiment(s).

REFERENCE SIGN 1 corrugated tube
2 body of the corrugated tube
2a peak
2b valley
3 slit
4 mark
4a hole (mark)
4b projection (mark)
Y1 longitudinal direction of the tube

The invention claimed is:

1. A corrugated tube, comprising:
a body in which a plurality of peaks and a plurality of valleys are continuously alternated in a longitudinal direction of the body, and a slit formed in the body along the longitudinal direction of the body,
wherein both end portions of the body between which the slit is interposed are overlapped,
wherein at least one mark is provided to at least one peak of the plurality of peaks or at least one valley of the plurality of valleys disposed at the both end portions adjacent to the slit, and
wherein at least one additional mark is provided to at least one corresponding peak or valley which is disposed at the other end portion of the both end portions, and brought into a fitting engagement with the at least one marked peak or valley disposed at the one end portion.

2. The corrugated tube according to claim 1, wherein at least two marks are respectively provided to at least two peaks of the plurality of peaks or at least two valleys of the plurality of valleys at the one end portion, wherein at least two additional marks are respectively provided to at least two corresponding peaks or valleys which are disposed at the other end portion and respectively brought into a fitting engagement with the at least two marked peaks or valleys disposed at the one end portion, and
wherein the at least two marks respectively provided to at least two peaks are arranged at an interval of at least one peak in the longitudinal direction of the body, or the at least two marks respectively provided to at least two valleys are arranged at an interval of at least one valley in the longitudinal direction of the body.

3. The corrugated tube according to claim 1, wherein a peak of the plurality of peaks is non-circular in cross section, and a valley of the plurality of valleys is circular in cross section.

4. A corrugated tube, comprising:
a body in which a plurality of peaks and a plurality of valleys are continuously alternated in a longitudinal direction of the body, and
a single, one-straight-lined slit formed in the body along the longitudinal direction of the body, wherein both end portions of the body between which the slit is interposed are overlapped,
wherein the plurality of peaks disposed at an one end portion of the both end portions is respectively brought into a fitting engagement with the corresponding plurality of peaks disposed at the other end portion of the both end portions, and the plurality of the valleys disposed at the one end portion is respectively brought into a fitting engagement with the corresponding plurality of valleys disposed at the other end portion,
wherein neighboring peaks or neighboring valleys have different shapes in a longitudinal direction of the body.

* * * * *